May 26, 1936.　　　　　G. FOX　　　　　2,042,301

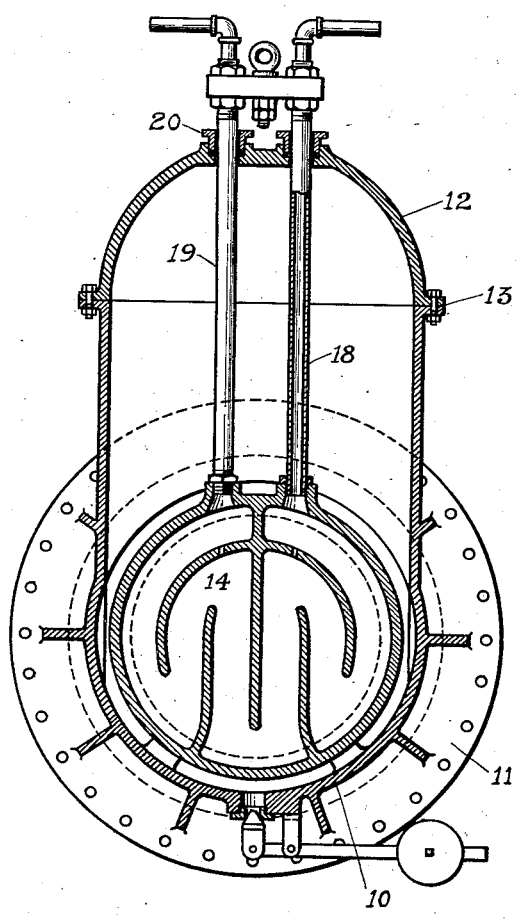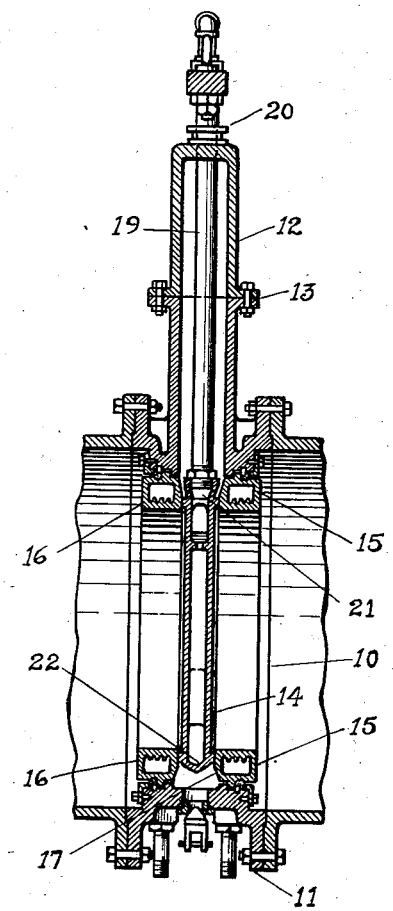

VALVE SEAT FOR AIR BLAST VALVES

Filed May 3, 1934　　　　　2 Sheets-Sheet 2

Inventor:
Gordon Fox
By Wilkinson, Huxley, Byron & Knight
Attys.

Patented May 26, 1936

2,042,301

UNITED STATES PATENT OFFICE 2,042,301

VALVE SEAT FOR AIR BLAST VALVES

Gordon Fox, Chicago, Ill., assignor to Freyn Engineering Company, Chicago, Ill., a corporation of Maine Application May 3, 1934, Serial No. 723,722

10 Claims. (Cl. 251—167)

The invention relates to hot blast valves of the gate type and has reference more particularly to valves designed for use in gas and air conduits, especially the water cooled type disclosed in the patent to Mathesius, No. 1,228,463 dated June 5, 1917 which is extensively used in hot blast mains of metallurgical furnaces.

Valves of the character described soon develop structural defects when used in connection with hot blast stoves of blast furnaces requiring removal of the entire valve and replacement of the faulty member. The principal faults that have been evident in these valves as constructed in the past are failure of the copper castings of both the valve seat and the gate member, due to the formation of cracks, air leakage between the gate member and the valve seats, and leakage between some of the joints of the steel housing. An analysis of the valve during operation will disclose the fact that the walls of the valve seats are subjected to different temperatures and also that one wall of the gate valve when in closed position is in direct contact with gases at a higher temperature than the gases on the opposite side of the gate. Apparently failure of the copper castings occurs because of stresses imposed by tendencies to distortion which are the result of the temperature differences in the walls of the castings. This distortion may also explain the air leakage which eventually develops between the valve seats and gate.

In the investigations and experiments leading up to the present invention it was found that the heat absorbed by the internal surface of a valve seat, that is, the surface adjacent the hot blast duct, accounted for approximately eight-two per cent of the total absorption of the seat. Although calculations indicate that a greater number of B. t. u.'s per hour are dissipated from the water surface of the internal wall of the seat, the rate of dissipation is not in proportion to the heat absorbed. The resulting temperature differences in the walls of the valve seat lead to the development of stresses in the metal and ultimate failure of the member.

Substantially the same conditions were found to exist with respect to the valve gate. When the gate is closed the difference in the temperature of the side walls of the gate develops severe stresses in the ring connecting said walls and also in the reinforcing ribs joining the walls. It is evident that in addition to simple, shear, compression and tension stresses, certain beam effects result, producing serious stresses in the walls in the area between the ribs, which explains the failure due to cracking in the areas between the ribs.

The invention proposes to overcome the above defects in the construction of gate valves and has for an object to provide valve seats and a valve gate of improved structural design, which will minimize the temperature differences existing in the walls of said members during use, to thereby materially reduce the resulting stresses and prolong the life of the members.

A further object is to provide a construction of valve seat which will facilitate the flow of heat from the internal wall to the side walls connecting therewith, thereby minimizing the temperature drop in these walls and which will have the additional result of increasing the effectiveness of the cooling water, thereby decreasing the temperature of all of the walls of the valve seat, to thus indirectly minimize the temperature differences which lead to failures.

Another object is to improve the construction of housing for gate valves which will eliminate such joints as tend to develop leaks and which will incorporate novel means for retaining the valve seats within the housing.

With these and various other objects in view, the invention may consist of certain novel features of construction and operation, as will be more fully described and particularly pointed out in the specification, drawings and claims appended hereto.

In the drawings which illustrate an embodiment of the device, and wherein like reference characters are used to designate like parts—

Figure 1 is a vertical sectional view through a gate valve constructed in accordance with the present invention;

Figure 2 is a transverse sectional view taken at right angles to that of Figure 1;

Figure 4:
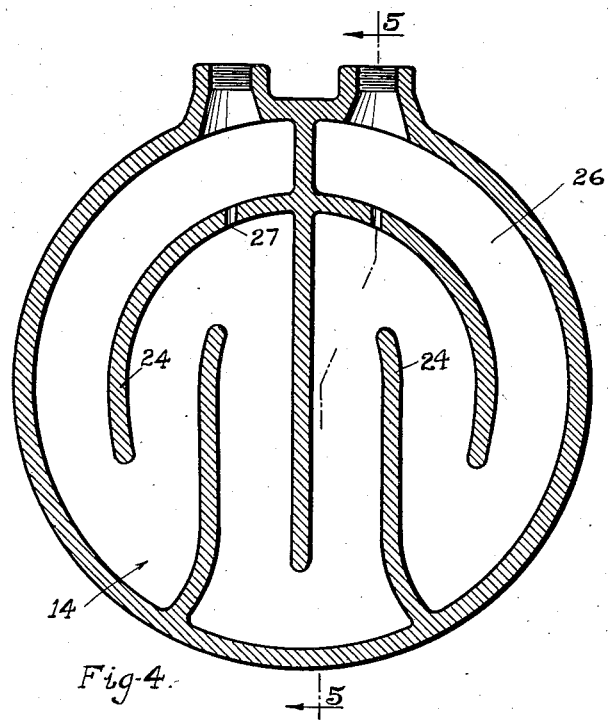
Figure 4 is a detail sectional view of the gate.
Figure 5:
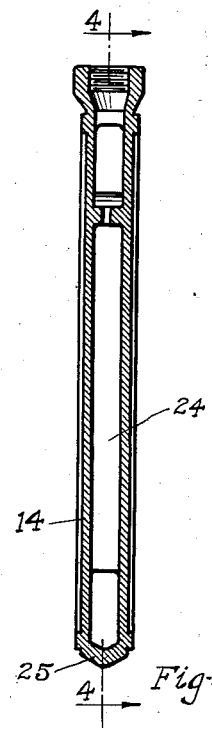
Figure 5 is a transverse sectional view taken substantially along line 5—5 of Figure 4.

The valve casing comprises a body portion formed by the integral housing 10 having the vertical flanges 11 for securing the valve body to the hot blast main and a top portion 12 secured in any well known manner as at 13 to the body. A circular hollow valve or gate 14 is located within the valve body and positioned between annular valve seats 15 and 16 which have their inwardly directed surfaces tapered as at 17 to provide a seat for the valve 14. The valve stem for supporting the valve 14 comprises two pipes 18 and 19 extending through the top of casing 12 and being guided by the glands 20. By employing pipes as valve stems provision is made for an inlet and outlet through which cooling water is delivered and discharged from the interior of the valve. Pipes 18 and 19 provide a stem suspending the valve so that it is free to swing from the glands 20. The thickness of the valve is slightly less than the distance between the faces of the valve seats to permit limited swinging movement which is increased by the taper given the valve as the same is preferably constructed so that portion 21 adjacent the stem has a thickness slightly in excess of portion 22. Valves of this type rely for their closing on the pressure of the gas against the gate. The taper of the sides of the valve 14 is such that when the same is swung against either valve seat 15 or 16 a perfect and complete seal between the valve and seat against which it is forced will be made.

Figure 3:
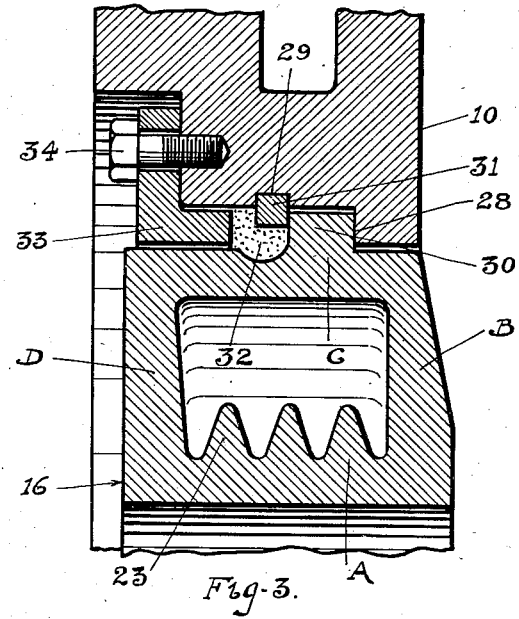
Figure 3 is a fragmentary sectional view showing the construction of the improved valve seat and the method of retaining the valve seat in the steel housing.

Referring to Figure 3, the valve seat shown in cross section may be described as formed of a wall A, which is subjected to the highest temperature as the same forms the internal wall of the seat, a rear wall C, and connecting walls B and D. The initial flow of high temperature gases through the valve immediately raises the temperature of wall A as the same is in direct contact with said gases, and is also exposed to radiant heat, causing said wall to expand and which expansion is much greater than that of wall C. This places wall A in compression, which may result in a permanent set by reason of the compressive forces and wall C in tension. When the temperature becomes more nearly equalized throughout the valve seat wall A is subjected to tension. Repetition of these compression and tension stresses in the two walls, particularly the inner wall of the valve seat has been the cause of failure of the castings as heretofore constructed.

To overcome the defects and structural weaknesses above described the invention provides a valve seat of radically new design. As shown in Figure 3, wall A is provided with inwardly directed ribs or projections 23 which extend throughout the periphery of the water surface of this wall. These projections increase the water surface of said wall and aid in the dissipation of heat therefrom. The connecting side walls B and D are tapered so that they have their portions of greatest thickness where said walls connect with A. The building up of the walls at these points strengthens these areas of the valve seats and further facilitates the flow of heat from wall A to walls B and D which is dissipated from said walls to the cooling water and to wall C. This flow of heat through the sections of increased thickness is minimized by the cooling effect aided by the projections or ribs 23 which are designed to approximately double the surface for this wall, although the base of the ribs are of a width to provide sufficient section of metal to permit ready flow of heat to the extended surface.

The heat flow from wall A to rear wall C is further aided by the decrease in the length of the connecting walls B and D in the improved structure of Figure 3 as contrasted with the length of said walls in the valve seats as heretofore constructed. This minimizes temperature differences between walls D and C. This decrease in the length of the side walls also decreases the cross sectional area of the water chamber which will result in an increase in the velocity of the cooling water if the same volume of water is supplied to the valve seats as in the past. Since the transfer of heat from metal to water varies in a definite relation to the water velocity the effectiveness of the cooling water flowing through the chamber in the valve seat is therefore materially increased. The result of the improved design is to minimize the temperature differences between wall A and wall C with the same amount of water flowing through the valve seats and other conditions remaining unchanged. With decreased temperature differences the stresses will be greatly diminished and should be safely below the elastic limit. The life of the valve seat is therefore materially extended.

The construction of the gate has also been improved to eliminate those structural defects which were instrumental in developing cracks in the casting. In accordance with the invention the width of the gate has been reduced and the reinforcing ribs 24 connecting the side walls thereof have been increased in number and materially strengthened by increasing their thickness. Also the connecting ring 25 has been increased in thickness, being provided with an arcuate interior surface and a surface on the exterior which tapers from the center of the ring toward each side wall. The result of the above is to aid the flow of heat from one wall of the gate to the other side wall. It will be recalled that when these valves are closed their respective side walls are subjected to gases at different temperatures and also to radiant heat which results in the producduction of stresses in the connecting ring and in the areas of the side walls between the reinforcing ribs. The above structure facilitates the flow of heat from wall to wall and therefore minimizes the temperature differences. The additional cooling surface of the extended reinforcing ribs, together with their ample cross section, also assists in the flow and the dissipation of heat from all parts of the hotter of the two side walls.

Another constructional feature resides in the arrangement of the ribs 24 which form a circuitous path 26 from inlet to outlet, traversing the entire area of the interior of the valve. The width of said circuitous path is selected so that the cooling water may have a fairly high velocity to secure the greatest cooling effect from said water. Openings 27 are located in certain of the ribs 24, as shown in Figure 4, to permit the escape of air, thus preventing the water passage from becoming air bound.

Referring again to Figure 1, it will be noted that the steel housing 10, forming the body member for the valve, is an integral one-piece member. The horizontal connecting flanges heretofore employed are thus eliminated and such joints as develop leakage are correspondingly reduced. Making the housing in one piece as described renders it necessary to insert the two valve seats from their respective sides of the valve. As the gas pressure forcing the valve into contact with the valve seat is considerable it is necessary to securely lock the seat to the valve body.

As shown in Figure 3, that portion of the housing 10 supporting a valve seat is provided with a shoulder 28 and a recess 29. Wall C of the valve seat has formed thereon a projection 30 extending throughout the periphery of the seat and which engages shoulder 28 to position the seat within the valve body. When the seat is in place a segmental key 31 is located in recess 29 to hold the projection 30 in contact with shoulder 28. The key is made in a number of arcuate segments to permit removal of the valve seat although when all segments are in place in recess 29 a secure and effective lock is provided. High temperature packing 32 is packed against the segmental key and is held in place by a keeper ring 33 securely fastened to the valve body by the screws 34.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a gate valve, in combination, a casing, a pair of annular seat members vertically positioned in spaced relation within the casing, a disc valve for location between the seat members, each of said members comprising an inner and outer peripheral wall and connecting side walls, whereby a passage is provided for circulating a cooling fluid through the member, and projections on the interior surface of one wall of the member to increase the surface exposed to the cooling fluid.

2. In a gate valve, in combination, a casing, a pair of annular seat members vertically positioned in spaced relation within the casing, a disc valve for location between the seat members, each of said members comprising an inner and outer peripheral wall and connecting side walls, whereby a passage is provided for circulating a cooling fluid through the member, and projections on the interior surface of one wall of the member to increase the surface exposed to the cooling fluid, said projections having a base of sufficient width to aid the flow of heat from said wall to the surface of the projections.

3. In a gate valve, in combination, a casing, a pair of annular seat members vertically positioned in spaced relation within the casing, a disc valve for location between the seat members, each of said members comprising an inner and outer peripheral wall and connecting side walls, whereby a passage is provided for circulating a cooling fluid through the member, and projections on the interior surface of the inner wall of the member to increase the surface exposed to the cooling fluid.

4. In a gate valve, a casing, a valve mounted in said casing, an annular seat member located on each side of the valve for contact therewith comprising an inner and outer peripheral wall and connecting side walls, whereby a passage is provided for circulating a cooling fluid through the member, projections on the interior wall of the member to increase the surface exposed to the cooling fluid, and said side walls having sections of increased thickness where they join with the inner wall.

5. In a gate valve, in combination, a casing, a valve mounted in said casing, an annular seat member located on each side of the valve and adapted to have engagement with said valve, said member comprising an inner and outer peripheral wall and connecting side walls of relatively short length, and projections formed on the inside surface of the inner peripheral wall to increase the surface exposed to the cooling water flowing through the member.

6. In a gate valve, in combination, a casing, a pair of annular seat members vertically positioned in spaced relation within the casing, a disc valve for location between the seat members, each of said members comprising an inner and outer peripheral wall and connecting side walls, whereby a passage is provided for circulating a cooling fluid through the member, and projections on the interior surface of the inner wall of the member to increase the surface exposed to the cooling fluid, said projections having a base of sufficient width to aid the flow of heat from said wall to the surface of the projections.

7. In a gate valve, in combination, a valve casing comprising an annular member, a pair of annular seat members vertically positioned within the casing, spaced shoulders formed in the interior wall of the casing for holding the seat members in spaced relation, a segmental key for each shoulder for confining the respective seat member between the shoulder and said key, said key removably fitting within a recess formed in the interior wall of the casing, and packing in the space between the interior wall and each seat member and in contact with the respective segmental key, whereby said packing holds the segmental key in place and seals the joint between the seat member and said interior wall.

8. In a gate valve, in combination, a valve casing comprising an annular member having an interior wall provided with spaced shoulders, a pair of annular seat members each having a projection on its periphery for engaging one of said shoulders, whereby the seat members are retained in spaced relation within the casing, a segmental key fitting within a recess formed in the interior wall of the casing in spaced relation to each shoulder, said key engaging the projection on the respective seat member for locking the seat member in place, and packing having contact with each key for sealing the joint between the seat member and said wall.

9. In a gate valve, in combination, a valve casing comprising an annular member having an interior wall provided with spaced shoulders, a pair of annular seat members vertically positioned in the casing, each member having means on its periphery for engaging one of said shoulders, a segmental key retained by said interior wall and contacting the other side of said means for locking the seat member in place, packing around the exposed sides of said key for sealing the joint between the seat member and wall, and means holding the packing under pressure.

10. In a gate valve, in combination, a valve casing comprising an annular member having an interior wall provided with spaced shoulders, a pair of annular seat members vertically positioned in the casing, each member having means on its periphery for engaging one of said shoulders, a key retained by said interior wall and contacting the other side of said means for locking the seat member in place, packing around the exposed sides of said key for sealing the joint between the seat member and wall, and a keeper removably secured to the casing holding the packing under pressure.

GORDON FOX.